United States Patent [19]
Pender et al.

[11] Patent Number: 5,895,679
[45] Date of Patent: Apr. 20, 1999

[54] EGG HOLDER AND TRAY FOR COLORING EGGS

[75] Inventors: John C. Pender, Jamison, Pa.; Charles Wood Saunders, Jr., Memphis, Tenn.; Daniel Robert Williams, Naperville, Ill.; James S. Mandle, Woodcliff Lake, N.J.

[73] Assignee: Schering-Plough HealthCare Products, Inc., Memphis, Tenn.

[21] Appl. No.: 08/867,151

[22] Filed: May 30, 1997

[51] Int. Cl.⁶ .................................................. A23B 5/00
[52] U.S. Cl. ..................... 426/302; 426/303; 426/304; 118/13; 118/14; 118/26; 118/30; 118/423; 118/428; 118/500; 118/501
[58] Field of Search .................... 118/13, 14, 26, 118/30, 423, 428, 500, 501; 426/298, 302, 303, 304; 211/14; 99/440; 206/521.1, 562; 220/528, 529

[56] References Cited

U.S. PATENT DOCUMENTS

| | | |
|---|---|---|
| 65,896 | 6/1867 | Fellows . |
| 66,492 | 7/1867 | Hellen . |
| 105,901 | 8/1870 | Brown . |
| D. 144,441 | 6/1945 | Zeleski . |
| D. 154,910 | 8/1949 | De Luce . |
| D. 160,375 | 8/1948 | Edlund . |
| D. 168,879 | 2/1953 | Becker . |
| D. 178,858 | 10/1956 | Babcock . |
| D. 179,668 | 2/1957 | Ward . |
| 213,772 | 4/1879 | Nelson . |
| 220,390 | 8/1879 | Koska . |
| 227,633 | 5/1880 | Koska . |
| 319,954 | 6/1885 | Butterfield . |
| D. 363,496 | 10/1995 | Mandle . |
| D. 363,497 | 10/1995 | Mandle . |
| 452,994 | 5/1891 | Dodd . |
| 909,939 | 1/1909 | Richmond . |
| 1,027,079 | 5/1912 | Shepard . |
| 1,081,701 | 12/1913 | Sandmann . |
| 1,156,459 | 10/1915 | Brown . |
| 1,464,967 | 8/1923 | Beauregard . |
| 1,520,227 | 6/1924 | DeVitalis . |
| 1,538,367 | 5/1925 | Young . |
| 1,767,553 | 6/1930 | Rose . |
| 1,829,689 | 10/1931 | Townley et al. . |
| 1,850,131 | 3/1932 | Mennicke ..................... 99/440 |
| 1,935,901 | 8/1933 | Augenblick . |
| 1,952,612 | 6/1934 | Sherwood . |
| 1,967,040 | 7/1934 | Pickett . |
| 1,982,820 | 6/1934 | Lowenstein . |
| 2,078,488 | 4/1937 | Farnham . |
| 2,109,965 | 12/1935 | Booth . |
| 2,134,908 | 11/1938 | Copeman . |
| 2,199,201 | 4/1940 | Heden . |
| 2,226,844 | 12/1940 | Carr .............................. 99/440 |
| 2,593,566 | 4/1952 | Kamp . |
| 3,143,059 | 8/1964 | Sofio ............................ 99/440 |
| 3,311,231 | 3/1967 | English, Jr. . |
| 3,381,873 | 5/1968 | Hirota . |
| 3,628,818 | 12/1971 | Pittman . |
| 3,745,973 | 7/1973 | Knecht ......................... 118/400 |
| 3,848,564 | 11/1974 | Kull .............................. 118/13 |
| 3,988,834 | 11/1976 | Anderson ..................... 33/21.1 |
| 4,181,745 | 1/1980 | Growe et al. ................ 426/250 |
| 4,370,941 | 2/1983 | Belton . |
| 4,371,555 | 2/1983 | Tully ............................ 426/250 |
| 4,419,103 | 12/1983 | Balkan . |
| 4,531,575 | 7/1985 | Thill ............................. 118/503 |
| 4,573,586 | 3/1986 | Helmer ........................ 211/14 |
| 4,664,925 | 5/1987 | McShane . |
| 4,693,205 | 9/1987 | Thill ............................. 118/13 |
| 4,798,133 | 1/1989 | Johnson ....................... 99/440 |
| 4,798,162 | 1/1989 | Nelson ......................... 118/26 |
| 4,853,240 | 8/1989 | McShane . |
| 4,967,687 | 11/1990 | McShane ..................... 118/13 |
| 5,063,871 | 12/1991 | Chambers .................... 118/13 |
| 5,074,239 | 12/1991 | Law .............................. 118/429 |
| 5,164,009 | 11/1992 | Chandler ..................... 118/13 |
| 5,348,766 | 9/1994 | Latham . |
| 5,565,229 | 10/1996 | Mandle ........................ 426/250 |

*Primary Examiner*—Laura Edwards
*Attorney, Agent, or Firm*—Joseph T. Majka

[57] ABSTRACT

An novel egg holder is claimed. The egg holder is used in combination with a tray and dye containing liquid for coloring eggs.

10 Claims, 8 Drawing Sheets

EGG HOLDER AND TRAY FOR COLORING EGGS

BACKGROUND

Coloring eggs has been an Eastern custom among many religious and national groups. In the United States, the art of decorating Easter eggs is a well-known annual activity which is enjoyed by many people. In coloring the egg, typically tongs or wire scoop is used to dip the egg into one or more containers of various dyes. However, such devices require a certain degree of manual dexterity to handle the eggs, especially where it is desired to dip the egg into the dye at a uniform or consistent depth to make the desired patterns. Accordingly, it would be desirable to provide a device and a method for coloring eggs which simplifies the coloring compared with other known devices. It would also be desirable to provide a device and a method for coloring eggs which would enable the user to create more consistent, uniform patterns than with other known devices.

SUMMARY OF THE INVENTION

In one embodiment, the present invention is directed toward an egg holder comprising:

a base having top and bottom surfaces;
said base having an aperture defined by an edge, wherein the diameter of said aperture is smaller than the dimensions of an egg so that when an egg is placed in the aperture, the egg is supported by said aperture edge and at least a portion of the egg protrudes through said aperture;
at least one projection has side walls extending from the top surface of said base, wherein said projection is adjacent to said aperture edge.

In a preferred embodiment, the present invention is directed toward an egg holder comprising:

a base having top and bottom surfaces;
said base having an aperture defined by an edge, wherein the diameter of said aperture is smaller than the dimensions of an egg so that when an egg is placed in the aperture, the egg is supported by said aperture edge and at least a portion of the egg protrudes through said aperture;
at least a pair of projections have side walls extending from said base, wherein said projections are adjacent to said aperture edge.

Preferably, the aperture of the egg holder is circular or egg shaped. Also preferred is that the egg holder is made of a flexible plastic, such as a transparent plastic. Also preferred is that at least one projection of said egg holder has ridges or grooves on at least one projection side wall to enable a user to grasp the egg holder. Also preferred is that the pair of projections are substantially parallel to each other.

In another preferred embodiment, the present invention is directed toward a device for coloring eggs, comprising:

a) an egg holder having a base with top and bottom surfaces;
said base having an aperture defined by an edge, wherein the diameter of said aperture is smaller than the dimensions of an egg so that when an egg is placed in the aperture, the egg is supported by said aperture edge and at least a portion of said egg protrudes through said aperture;
said egg holder further has at least a pair of projections having side walls extending from said base, wherein said projections are adjacent to said aperture edge; and

2 b) a tray capable of holding a liquid containing an egg coloring dye, wherein the tray has a bottom and upstanding sidewalls extending from said bottom, wherein said base of said egg holder rests upon and is supported by said upstanding sidewalls of said tray.

Preferably the tray is marked with a fill line for liquids. Also preferred is that the egg holder and tray are made of plastic.

In another embodiment, the present invention is directed toward a kit for coloring an egg comprising:

a) an egg holder having a base with top and bottom surfaces;
said base having an aperture defined by an edge, wherein the diameter of said aperture is smaller than the dimensions of an egg so that when an egg is placed in the aperture, the egg is supported by said aperture edge and at least a portion of said egg protrudes through said aperture;
at least one projection has side walls extending from the top surface of said base, wherein said projection is adjacent to said aperture edge;
b) a tray capable of holding a liquid;
c) one or more egg coloring dyes; and
d) a container for holding said egg holder, said tray and said coloring dyes.

In another embodiment, the present invention is directed toward a method for coloring an egg comprising the steps of:

a) placing an egg holder upon a first tray with a dye containing liquid, wherein the egg holder comprises
a base with top and bottom surfaces;
said base having an aperture defined by an edge, wherein the diameter of said aperture is smaller than the dimensions of an egg so that when an egg is placed in the aperture, the egg is supported by said aperture edge and at least a portion of the egg protrudes through said aperture into the dye containing liquid;
at least one projection of said egg holder has side walls extending from the top surface of said base, wherein said projection is adjacent to said aperture edge;
b) removing the partially colored egg from said first tray;
c) repositioning said partially colored egg so that a non-colored portion of the egg protrudes through said aperture of said egg holder;
d) placing said partially colored egg with said egg holder into a second tray containing a different dye for further coloration.

One advantage of the present invention is that it provides an novel egg holder and device for coloring eggs which allows the user to create overlapping patterns and colorations on the egg surface.

A second advantage of the present invention is that it provides a novel egg holder and device for providing multiple colors to an egg at selected locations on the egg surface.

A third advantage of the present invention is that it provides a novel egg holder and device for coloring eggs that minimizes inadvertent dye coloration of the hands.

A fourth advantage of the present invention is that it provides a novel egg holder and device for coloring eggs that easy to use and reusable.

DETAILED DESCRIPTION OF THE DRAWINGS

Figure 1:
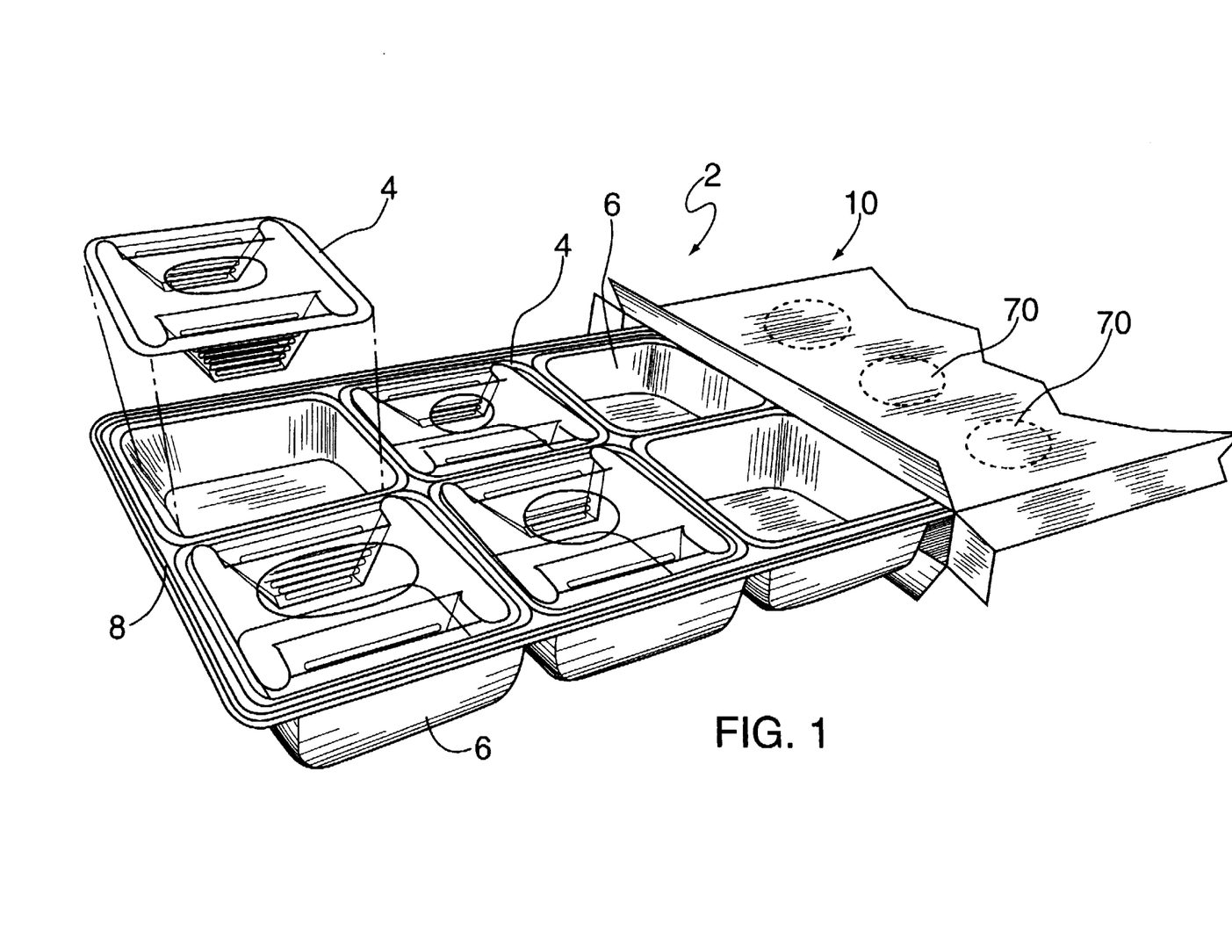
FIG. 1 is a top perspective view of a kit containing four egg holders and six interconnected trays in a frame.

FIG. 1 shows a partially opened kit 2 made up a package, four inverted egg holders 4 and six trays 6 which are interconnected in the same frame 8, and one or more coloring dyes (not shown), all of which fits conveniently into container, box or carton 10. Optionally and preferably, box, carton or container 10 can serve as a drying tray, wherein container 10 has circular perforations 70 which can be punched, pushed or cut out to allow the drying of colored eggs on the container in the circular punch outs.

Figure 2:
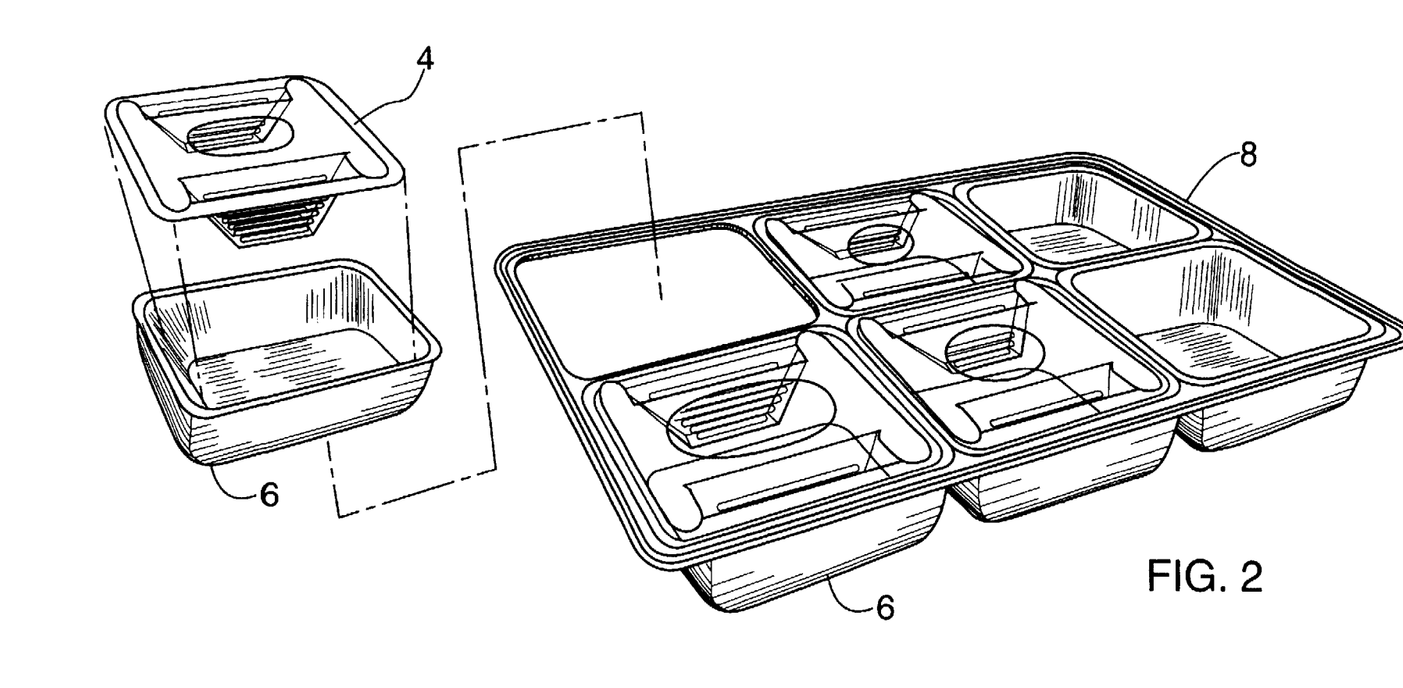
FIG. 2 is a top perspective view of an egg holder and a tray that has been detached from the interconnected trays.

FIG. 2 shows an individual egg holder 4 and a tray 6 that has been detached from frame 8 via pre-formed punctures or perforations for separating the trays from the frame. Optionally, frame 8 can lack such punctures or perforations so that all the trays 6 are a single, integral piece.

Figure 2A:
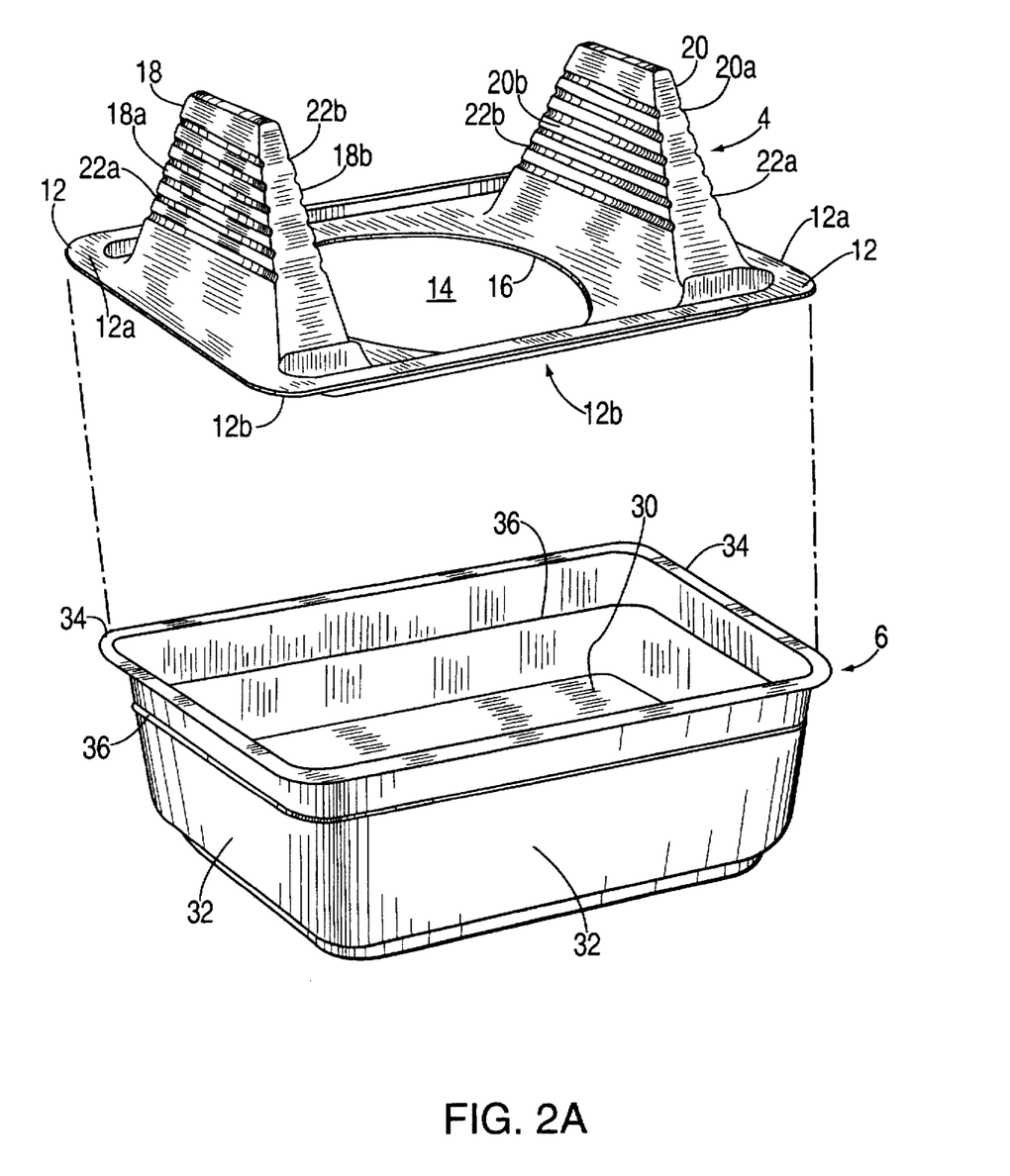
FIG. 2A shows an exploded front perspective view of the egg holder and tray.

FIG. 2A shows egg holder 4 having a base 12 with top surface 12a and bottom surface 12. Base 12 has an aperture 14 defined by edge 16. In this embodiment, the base is substantial planar. The diameter of aperture 14 taken across its longest dimension, is smaller than the dimensions of an egg so that when an egg (not shown) is placed in aperture 14, the egg is supported by aperture edge 16 and at least a portion of the egg protrudes through said aperture. Aperture 14 can be any convenient shape but preferably is circular or egg shaped. Egg holder 4 has two projections 18 and 20, which are adjacent to aperture edge 16 and substantially parallel to each other. Projections 18 and 20 have outwardly facing side walls 18a and 20a and inwardly facing side walls 18b and 20b. Side walls 18a, 18b, 20a and 20b extend from said base 12. For improved grasping or gripping by the fingers, projections 18 and 20 have outwardly facing ridges or grooves 22a on outwardly facing sidewalls 18a and 20a and inwardly facing grooves 22b on inwardly facing sidewall 18b and 20b. Tray 6 is capable of holding a liquid containing an egg coloring dye. Tray 6 has a bottom or bottom wall 30, from which extend contiguous, upstanding sidewalls 32 which terminate at a top surface or edge 34. When the egg holder and tray are being used to color an egg, bottom surface 12b of base 12 rests upon and be supported by the top surface or edge 34 of tray sidewalls 32. When tray 6 is filled with liquid to fill line 36, the dye containing liquid (not shown) will contact the portion of the egg extending through aperture 14.

Figure 2B:
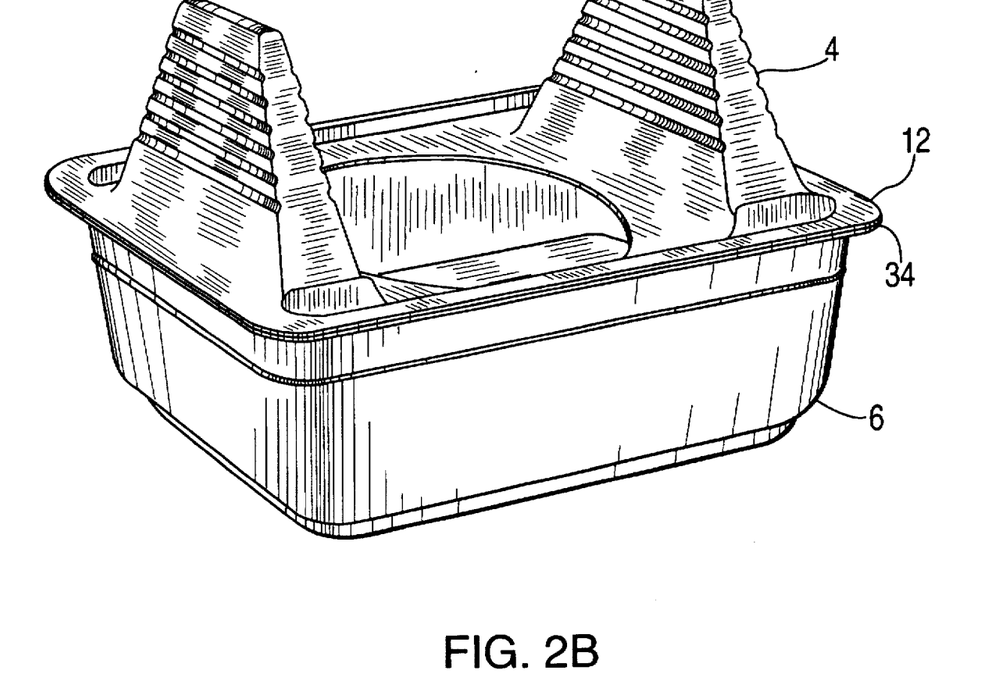
FIG. 2B shows a front perspective view of the egg holder resting upon the top surface of the tray.

FIG. 2B shows the fitted assembly of base 12 of egg holder 4 resting upon the top surface or edge 34 of tray 6.

Figure 3:
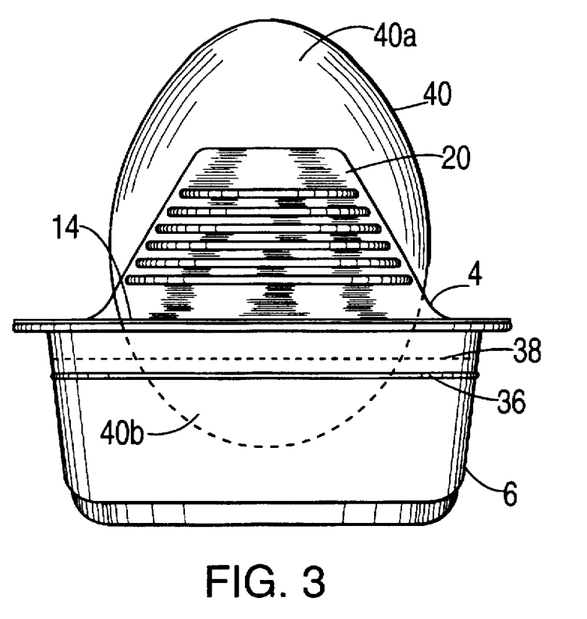
FIG. 3 shows a side view of an egg sitting longitudinal in the egg holder and tray.

FIG. 3 shows a side view of an egg 40 sitting longitudinally upright in assembled egg holder 4 and tray 6. Tray 6 is filled with liquid whose surface as indicated by horizontal dotted line 38, is slightly higher than fill line 36 when egg 40 extends into the liquid in tray 6, thus raising the liquid surface. Egg portion 40a extends above liquid surface 38 and egg portion 40b extends below the liquid surface 38.

Figure 4:
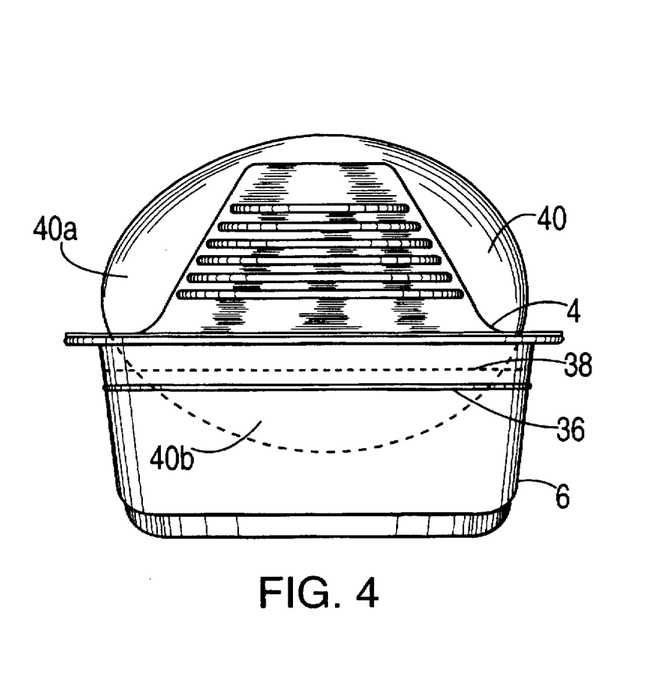
FIG. 4 shows a side view of an egg sitting laterally in the egg holder and tray.

FIG. 4 shows a side view of an egg sitting laterally or sideways in assembled egg holder 4 and tray 6. Tray 6 is filled with liquid whose surface as indicated by horizontal dotted line 38, is slightly higher than fill line 36 when egg 40 extends into the liquid in tray 6, thus raising the liquid surface. Egg portion 40a extends above liquid surface 38 and egg portion 40b extends below the liquid surface 38.

Figure 5A:
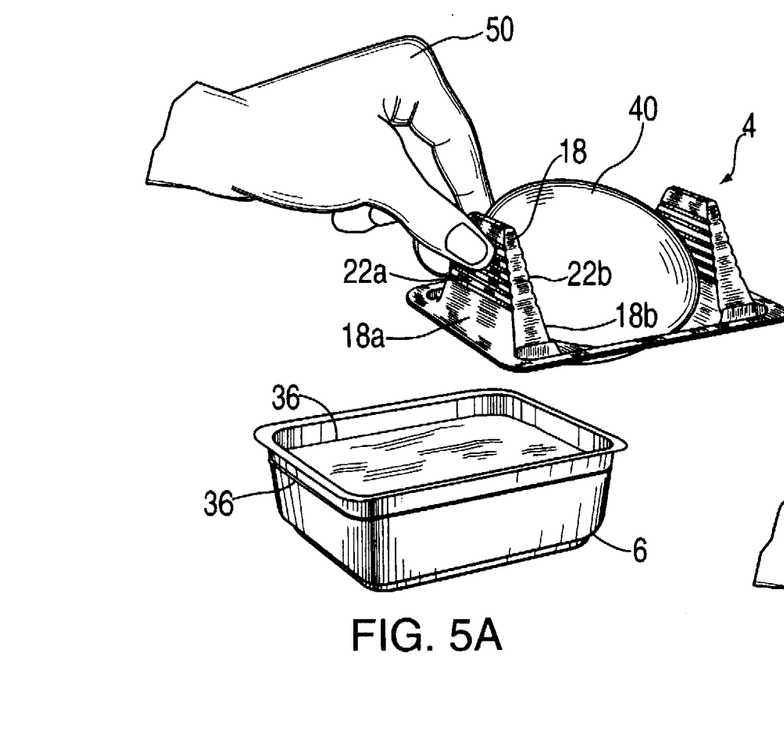
FIG. 5a shows a front perspective view where one projection is held for placing an egg in the egg holder on a tray containing a dye-coloring liquid.

FIG. 5a shows egg holder 4 is held with hand 50 using single projection 18. Projection 18 has outwardly facing ridges or grooves 22a on outwardly facing sidewalls 18a and inwardly facing grooves 22b on inwardly facing sidewall 18b. Egg holder 4 with egg 40 is to be placed upon tray 6 with dye containing liquid up to fill line 36.

Figure 5B:
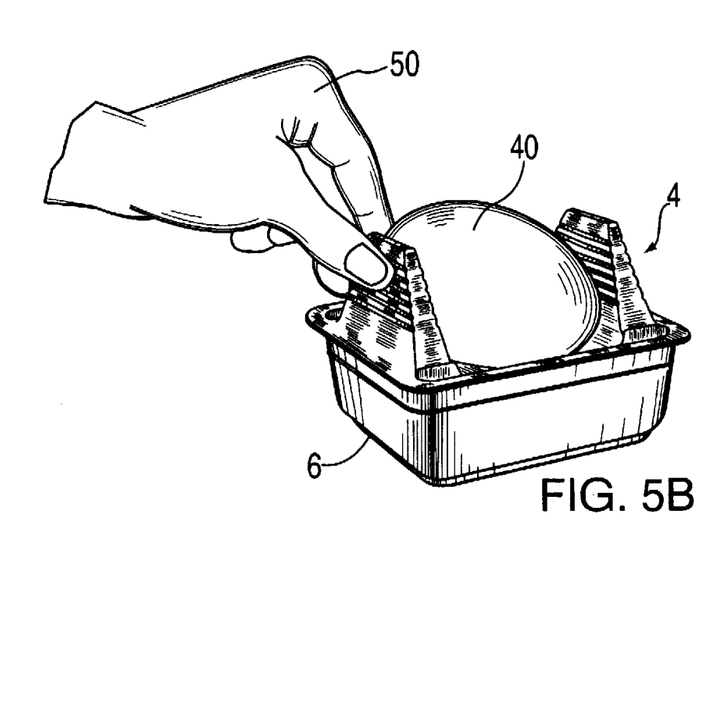
FIG. 5b shows a front perspective view where placement of the egg and egg holder on the tray is completed.

FIG. 5b shows the assembly by hand 50 of egg holder 4 fitting or resting upon tray 6 with egg 40 in place and into the liquid (not shown).

Figure 6A:
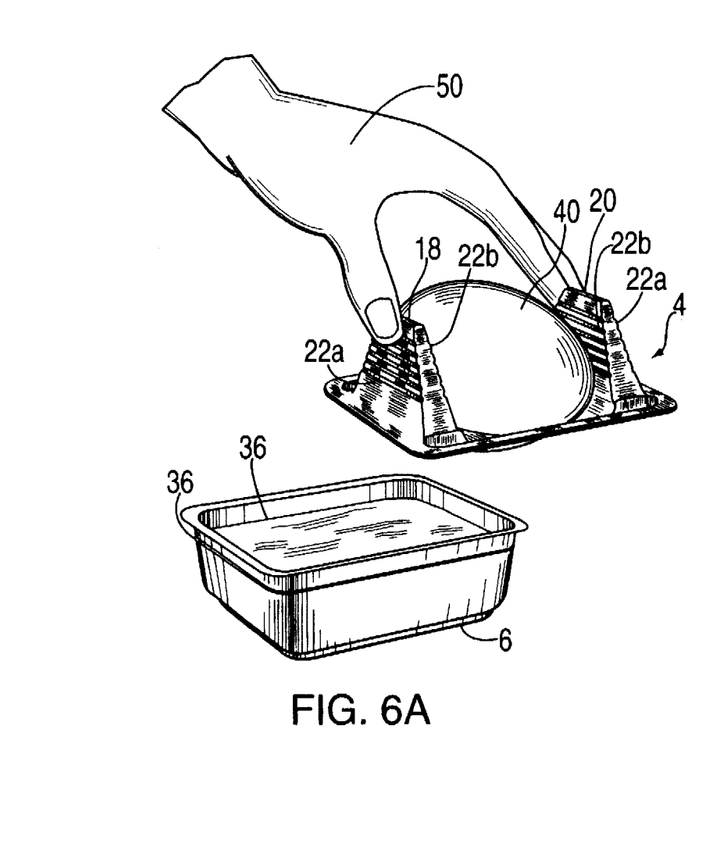
FIG. 6a shows a front perspective view where two projections are held for placing an egg in the egg holder on a tray containing a dye-coloring liquid.

FIG. 6a shows egg holder 4 is held with hand 50 using both projections 18 and 20. Projections 18 and 20 have outwardly facing ridges or grooves 22a on their outwardly facing sidewalls and inwardly facing grooves 22b on their inwardly facing sidewalls. Egg holder 4 with egg 40 is to be placed upon tray 6 with dye containing liquid up to fill line 36.

Figure 6B:
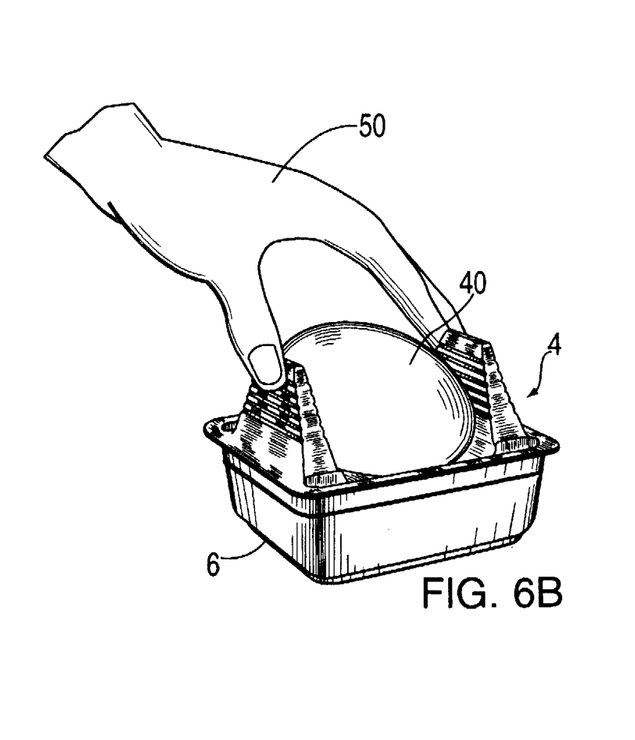
FIG. 6b shows a front perspective view where placement of the egg and egg holder on the tray is completed.

FIG. 6b shows the assembly by hand 50 of egg holder 4 fitting or resting upon tray 6 with egg 40 in place and into the liquid (not shown).

Figure 7:
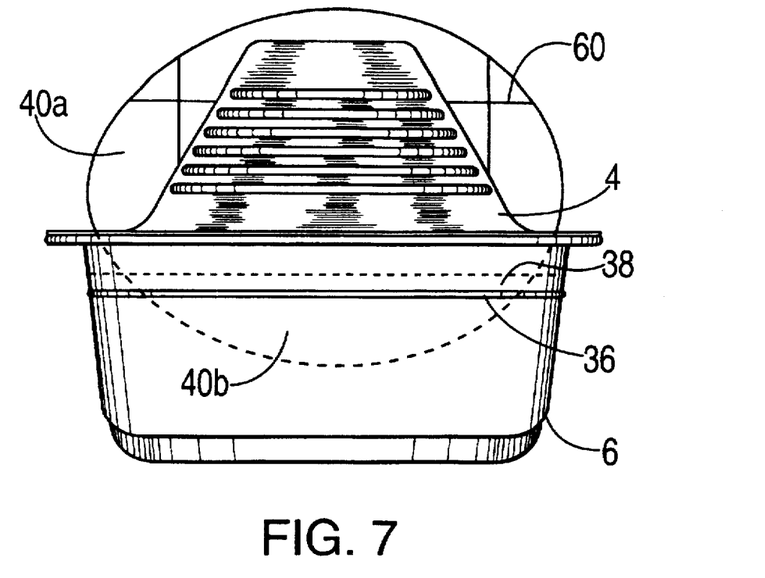
FIG. 7 shows a side view of a completed egg holder and tray where the egg has already been dipped into a first tray and the non-colored portion of the egg protruding through the aperture is being dipped in a second tray containing a different dye-coloring liquid.

FIG. 7 shows a side view of an assembled egg holder 4 and tray 6 similar to that in FIG. 4, except that egg 40 has previously been dipped into a first tray as indicated by color line 60, for example, blue. The non-colored portion 40b of the egg protruding through the aperture is being dipped in a second tray 6 containing a different dye-coloring liquid, for example, red. Tray 6 is filled with liquid whose surface as indicated by horizontal dotted line 38, is slightly higher than fill line 36 when egg 40 extends into the liquid in tray 6, thus raising the liquid surface. Egg portion 40a extends above liquid surface 38 and egg portion 40b extends below the liquid surface 38.

Figure 8:
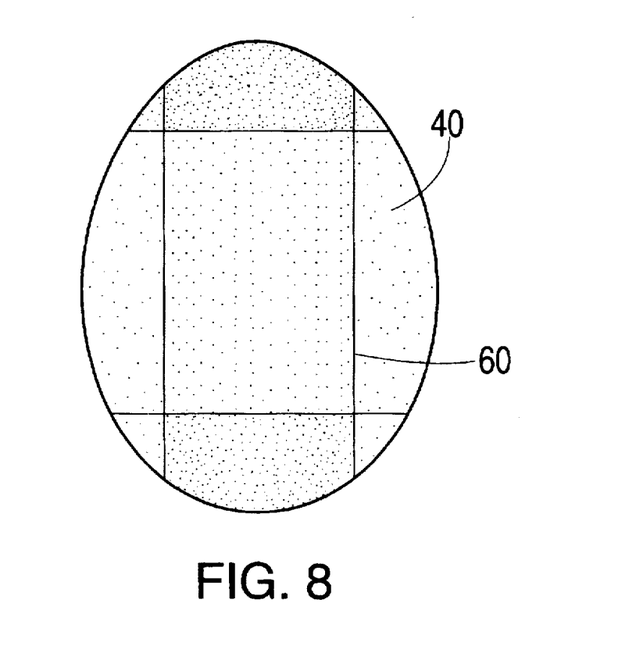
FIG. 8 shows a front view of an egg which has been dipped into at least two trays containing different

FIG. 8 shows a front view of an egg which has been dipped into trays containing different dye containing liquids, for example, yellow and orange.

DETAILED DESCRIPTION OF THE INVENTION

The terms "eggs" as used herein means intact, unbroken eggs, preferably chicken eggs. The eggs used with the egg holder and tray of the present invention should be light colored, preferably white. Prior to use in the egg press, the eggs should be hard-boiled, i.e., cooked in the shell in hot or boiling water until both white and yolk have solidified, in a vessel which minimizes discoloration of the egg surface. In one procedure, eggs are placed in a single layer in a pot, enough water is added to the pan to cover the eggs by an inch, the pot is covered and the water is quickly brought to a boil. The pot is removed from the heat source so that the water no longer boils and the eggs stand in the hot water for about 15 to 17 minutes. Cold water is run over the eggs until they are cooled. Suitable vessels include stainless steel or glass pots or pans, or vessels having an interior or enamel or glass coating. Vessels or pans made of aluminum or iron should be avoided. Preferably, the vessel and the water used for hard-boiling should be oil- and detergent-free. No oil or detergent should be added to the vessel or water used for boiling. After the eggs are hard boiled, the heated eggs should be cooled by flushing the vessel with cold water.

The coloring dyes used for coloring the eggs are well known and readily available commercially. The number of coloring dyes used with the present press can vary from two to six dyes or more. Suitable dyes include water-soluble dyes approved by the Food and Drug Administration (FDA) and conventionally used to color eggs, including red, yellow, blue, brown, orange, green, pink, chartreuse or combinations of the above. Suitable dyes may include FD&C red No. 3, FD&C yellow No. 6, FD&C blue No. 2, FD&C red No. 40, FD&C yellow No. 5 and FD&C blue No. 1. Tablets containing dyes may contain excipients such as sodium bicarbonate, maltodextrin, modified cellulose gum, magnesium stearate, zinc stearate, silica and sodium lauryl sulfate. Prior to use, the coloring dyes can be dissolved in a dilute acid, such as vinegar, in separate containers to provide one coloring dye per container.

The egg holder and tray can be made of any suitable material such as wood or any polymer which allows convenient manufacturing of the press, including flexible plastics such a polypropylene, polypropylene, polystyrene or polyvinyl chloride. The egg holder and tray may be of any desired colored or transparent. Preferably the egg holder is transparent and the tray is colored.

For preparation of the colors, vinegar is added to each tray (about 3 tablespoons). A color tablet containing the dye is dropped into the vinegar and mixed until dissolved. Cold water is added to the fill line on the tray.

During use, the egg holder is placed on the filled tray and an egg is rested in the aperture edge of the egg holder. The bottom of the egg will sit in the dye and be supported by the egg holder. The egg is allowed to sit in the dye containing liquid for about 3 minutes or more. When the desired color is achieved, the egg is removed from the dye containing liquid by grasping the egg holder by both projections and lifting up. The egg should be drained well and placed in a drying tray until dry. Once the egg is dry, another part of the egg can be colored using a different color dye. Parts of the first color can be overlapped with one or more different colors to make new color patches or plaid type designs. Preferably, the primary colors, i.e. red, blue and yellow, are used initially. To make new colors by overlapping, red over yellow makes orange; blue over yellow makes green; red over blue makes purple. Preferably, only part of a color is overlapped to keep some of the first color and make a new color. If pastel colors are desired, the less time the egg sets in the dye, the more pastel the color. Preferably, the egg is completely dry before dipping into a new color.

What is claimed is:

1. A device for coloring eggs, comprising:
 a) an egg holder having a base with top and bottom surfaces;
  said base having an aperture defined by an edge, wherein the diameter of said aperture is smaller than the dimensions of an egg so that when an egg is placed in the aperture, the egg is supported by said aperture edge and at least a portion of said egg protrudes through said aperture;
  said egg holder further has at least a pair of projections having side walls extending from said base, wherein said projections are adjacent to said aperture edge and are positioned on opposite sides of said aperture; and
 b) a tray for holding a liquid containing an egg coloring dye, wherein the tray has a bottom and upstanding sidewalls extending from said bottom, wherein said base of said egg holder rests upon and is supported by said upstanding sidewalls of said tray.

2. The device of claim 1 wherein said aperture of said egg holder is circular or egg shaped.

3. The device of claim 2 wherein at least one projection of said egg holder has ridges or grooves on at least one projection side wall to enable a user to grasp said egg holder.

4. The device of claim 2 wherein said pair of projections of said egg holder are substantially parallel to each other.

5. The device of claim 2 wherein said tray is marked with a fill line for liquids.

6. A kit for coloring an egg comprising:
 a) an egg holder having a base with top and bottom surfaces;
  said base having an aperture defined by an edge, wherein the diameter of said aperture is smaller than the dimensions of an egg so that when an egg is placed in the aperture, the egg is supported by said aperture edge and at least a portion of said egg protrudes through said aperture;
  at least one projection has side walls extending from the top surface of said base, wherein said projection is adjacent to said aperture edge;
 b) a tray for holding a liquid;
 c) one or more egg coloring dyes; and
 d) a container for holding said egg holder, said tray and said coloring dyes.

7. The kit of claim 6 wherein said egg holder has a pair of projections having side walls extending from said base.

8. The kit of claim 6 wherein said aperture of said egg holder is circular or egg shaped.

9. The kit of claim 6 wherein at least one projection of said egg holder has ridges or grooves on at least one projection side wall to enable a user to grasp said egg holder.

10. A method for coloring an egg comprising the steps of:
 a) placing an egg holder upon a first tray with a dye containing liquid, wherein the egg holder comprises a base with top and bottom surfaces;
  said base having an aperture defined by an edge, wherein the diameter of said aperture is smaller than the dimensions of an egg so that when an egg is placed in the aperture, the egg is supported by said aperture edge and at least a portion of the egg protrudes through said aperture into the dye containing liquid;
  at least one projection of said egg holder has side walls extending from the top surface of said base, wherein said projection is adjacent to said aperture edge;
 b) removing a partially colored egg from said first tray;
 c) repositioning said partially colored egg so that a non-colored portion of the egg protrudes through said aperture of said egg holder;
 d) placing said partially colored egg with said egg holder into a second tray containing a different dye for further coloration.

* * * * *